(12) United States Patent
Nemeth et al.

(10) Patent No.: US 11,318,922 B2
(45) Date of Patent: May 3, 2022

(54) VEHICLE BRAKE SYSTEM

(71) Applicant: KNORR-BREMSE SYSTEME FUER NUTZFAHRZEUGE GMBH, Munich (DE)

(72) Inventors: Huba Nemeth, Budapest (HU); Ferenc Zeman, Budapest (HU); Tamas Adler, Erd (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 41 days.

(21) Appl. No.: 16/612,610

(22) PCT Filed: Jun. 1, 2018

(86) PCT No.: PCT/EP2018/064425
§ 371 (c)(1),
(2) Date: Nov. 11, 2019

(87) PCT Pub. No.: WO2018/228828
PCT Pub. Date: Dec. 20, 2018

(65) Prior Publication Data
US 2020/0198609 A1  Jun. 25, 2020

(30) Foreign Application Priority Data

Jun. 16, 2017 (EP) .................................. 17176424

(51) Int. Cl.
*B60T 13/26* (2006.01)
*B60T 13/66* (2006.01)
(Continued)

(52) U.S. Cl.
CPC ............ *B60T 13/265* (2013.01); *B60T 7/045* (2013.01); *B60T 13/662* (2013.01);
(Continued)

(58) Field of Classification Search
CPC .... B60T 13/263; B60T 13/265; B60T 13/662; B60T 13/665; B60T 7/045; B60T 15/20;
(Continued)

(56) References Cited

U.S. PATENT DOCUMENTS 4,121,873 A * 10/1978 Durling ................. B60T 13/261
                                                    303/28
5,718,486 A *  2/1998 Vollmer .................... B60T 8/00
                                                    303/15
(Continued)

FOREIGN PATENT DOCUMENTS

CN         1036368 A    10/1989
CN         1989034 A     6/2007
(Continued)

OTHER PUBLICATIONS

EPO translation DE 10 2008009043 B3. (Year: 2009).*
(Continued)

*Primary Examiner* — Thomas J Williams
(74) *Attorney, Agent, or Firm* — Norton Rose Fulbright US LLP; Gerard Messina

(57) ABSTRACT

A brake system for a vehicle, the vehicle including a service brake control module and a parking brake with at least one spring brake chamber, the service brake control module controlling at least a first pressure module to brake a first set of wheels. The brake system comprises a parking brake control module configured to control the spring brake chamber to brake a second set of wheels and to control the first pressure module to brake the first set of wheels.

12 Claims, 5 Drawing Sheets

(51) Int. Cl.
  *B60T 15/04* (2006.01)
  *B60T 15/20* (2006.01)
  *B60T 7/04* (2006.01)

(52) U.S. Cl.
  CPC .......... *B60T 15/041* (2013.01); *B60T 15/203* (2013.01); *B60T 2270/413* (2013.01)

(58) Field of Classification Search
  CPC ................ B60T 15/203; B60T 15/041; B60T 2270/402; B60T 2270/412
  See application file for complete search history.

(56) References Cited

U.S. PATENT DOCUMENTS

| | | | | |
|---|---|---|---|---|
| 7,008,025 | B2 * | 3/2006 | McCann | B60T 8/323 303/122.15 |
| 8,560,162 | B2 * | 10/2013 | Herges | B60T 8/327 701/29.7 |
| 9,315,179 | B2 * | 4/2016 | Herges | B60T 7/20 |
| 2014/0015310 | A1 | 1/2014 | Hanzawa et al. | |
| 2016/0090069 | A1 | 3/2016 | Jeon | |
| 2016/0214582 | A1 * | 7/2016 | Brenn | B60T 7/042 |
| 2021/0347346 | A1 * | 11/2021 | Adler | B60T 13/385 |

FOREIGN PATENT DOCUMENTS

| | | | | |
|---|---|---|---|---|
| CN | 201009875 | Y | 1/2008 | |
| CN | 101687498 | A | 3/2010 | |
| CN | 102729962 | A | 10/2012 | |
| DE | 102005062907 | B3 | 5/2007 | |
| DE | 102008009043 | B3 | 5/2009 | |
| EP | 2794368 | B1 | 10/2014 | |
| WO | WO-2020057950 | A1 * | 3/2020 | ............ B60T 13/662 |

OTHER PUBLICATIONS

International Search Report dated Sep. 11, 2018, of the corresponding International Application PCT/EP2018/064425 filed Jun. 1, 2018.

* cited by examiner

VEHICLE BRAKE SYSTEM

FIELD OF THE INVENTION

The present invention relates to a brake system for a vehicle and a method for providing a brake system and, in particular, to a redundant brake system for an autonomous operation of transport vehicles or other commercial vehicles.

BACKGROUND INFORMATION

In recent times, there is an increasing demand for implementing more and more functions into various control units to further support the driver or to make the driver even redundant. Because such functions need particular hardware infrastructures, which are currently not yet readily available, commercial vehicles still require the presence and attention of the driver. However, in the future the driver shall be less involved in control tasks when driving the vehicle, because automated systems are going to take over more significant driving functions. To enable this, there is a demand for an increased reliability level, which may be achieved by implementing different types of system redundancies.

Conventional commercial vehicles still use electro-pneumatic or by-wire brake systems where the electronic part of the control is provided by a single circuit control. This is acceptable as long as in case of a malfunction of the control electronics the driver can still interfere and take over the control of the pneumatic part of the brake system, for example by hand-controlled or foot-controlled actuators. For this, a two-circuit pneumatic backup system is typically used in conventional vehicles so that the driver may activate the backup system.

However, for highly automated vehicles where the driver is not anymore in the control loop, or even not available or present in the vehicle, the above-mentioned brake system is insufficient, since during a driverless operation a malfunction of the single electronic control circuit cannot be compensated by an activation of the backup system by the driver. Therefore, there is a demand to add redundancies to the control of the available brake systems.

A known redundant brake system for a commercial vehicle is discussed in DE 10 2008 009 043. This system utilizes, by controlling spring parking brake chambers, the parking brake integrated into an air supply unit as a redundant brake actuator. Here, the control output of the trailer control module is used as pneumatic control input of the axle modulators for axles that are not equipped with spring parking brake chambers.

Patent document EP 2 794 368 discusses another conventional redundant brake system for a commercial vehicle. Again, the parking brake integrated into an air supply unit is used as a redundant brake actuator, wherein the spring parking brake chambers are controlled correspondingly. For axles not equipped with spring parking brake chambers, the air supply unit includes an additional electro-pneumatic modulator to generate a control pressure for the pneumatic control input of the respective axle modulators.

However, these conventional systems rely on the trailer control module or need an additional electro-pneumatic modulator for a redundant brake system. Therefore, there is a demand for more simple redundant brake systems.

SUMMARY OF THE INVENTION

At least some of the problems of the conventional devices as described before are overcome by a brake system as described herein, a vehicle according to the description herein and a method according to the description herein. The further descriptions herein refer to further advantageous realizations of the subject matter of the main descriptions herein.

The present invention relates to a brake system for a vehicle, especially for a commercial vehicle. The vehicle comprises a service brake control module and a parking brake with at least one spring brake chamber, wherein the service brake control module controls at least a first pressure module to brake a first set of wheels. The brake system comprises a parking brake control module configured to control the spring brake chamber to brake a second set of wheels and to control the first pressure module to brake the first set of wheels.

The first set of wheels may be the front axles wheels and the second set of wheels may be the rear axle wheels. But the invention shall not be limited thereto. The first and second set of wheels may refer to any wheels on the vehicle (e.g. at different axles).

The first pressure module may be any unit able to control (electronically or pneumatically or hydraulically) pressure in accordance to a brake demand. It is understood that any control of a physical quantity (e.g. a force, a pressure, a level of actuation, etc.) can be performed directly by modifying the physical quantity itself or indirectly by modifying another quantity that in turn results in a modification of the physical quantity.

The first pressure module may be controlled in parallel by the service brake control module and by the parking brake control module to ensure a redundant braking system. Hence, at any given time both brakes can be actuated by one action simultaneously. To actuate the braking, the driver (or a control unit) may activate a brake pedal which can be sensed by a corresponding sensor providing a sensor signal to the service brake control module and, at the same time, to the parking brake control module. In addition to this, a parking brake lever may be provided whose actuation can be sensed. The respective parking brake sensor signal may only be provided to parking brake control module that activates merely the spring brake chamber to activate the parking brake.

The vehicle may further comprise a trailer control module for controlling a braking of a trailer. In this case, the parking brake control module may comprise a trailer output line to couple to the trailer control module. The parking brake control module may comprise an inverse valve controlled by the trailer output line to enable a pneumatic control for the first pressure module.

Optionally, the service brake control module may be configured to control the braking of the first set of wheels through the first pressure module and the second set of wheels through a second pressure module, and the parking brake control module may be configured to control the second pressure module to actuate the spring brake chamber upon a parking brake request.

The parking brake control module may comprise a parking brake control unit to pneumatically control the trailer control module and/or the spring brake chamber(s). In this case, the inverse valve may be integrated in the parking brake control unit or in the first pressure modulator or is a standalone unit. Optionally, the parking brake control unit is likewise a standalone unit or an integrated part of another component of the brake system.

A standalone unit shall be any unit that is not integrated into another unit (e.g. by sharing a common housing) when mounted on the vehicle. Hence, it fulfills only the designated function. It may, however, be fluidly connected to other components via fluid lines.

Optionally, the inverse valve comprises an output pneumatically controlling in parallel the first pressure module and the second pressure module. For example, a pneumatic line from the inverse valve to the first pressure module has a junction to branch of a line to the second pressure module.

Optionally, an electro-pneumatic unit is arranged between the inverse valve (e.g. downstream from it) and the first pressure module to control the first pressure module by modulating an output of the inverse valve. Within the present disclosure, the term "between" shall refer to a fluid flow in that the respective unit is downstream from one component (e.g. the inverse valve) and upstream from the other component (e.g. the first pressure module). Hence, the electro-pneumatic unit may also be integrated in one of the components (the inverse valve or the first pressure module).

Optionally, the electro-pneumatic unit comprises an electro-pneumatic control valve being a standalone unit or an integrated part of the inverse valve or of the first pressure module or of the second pressure module.

Optionally, a further electro-pneumatic unit is arranged downstream of the trailer output line of the parking brake control module to electronically modulate the trailer control module.

The electro-pneumatic unit may again comprise an electro-pneumatic control valve being a standalone unit or an integrated part of the inverse valve or of the parking brake control module or of the trailer control module.

The vehicle may further comprise a control unit to electronically control a pneumatic brake pressure (e.g. for various valves). In this case, the first pressure module and/or the second pressure module is an/are electronic pressure modulator(s). Optionally, the first pressure module and/or the second pressure module comprise(s) at least one of the following components: a relay valve, a select high valve, a pressure control valve, wherein the pressure control valve is controlled by the control unit to provide compressed air to the select high valve. In addition, the select high valve may be configured to receive further compressed air from the inverse valve and to provide the higher received compressed air to the relay valve as control input to modulate a brake pressure in accordance to a brake demand.

The vehicle may further comprise a foot brake valve controllable by the driver. In this case, at least one further select high valve may be arranged downstream of an output of the inverse valve to select a higher pressure between the output of the inverse valve and the foot brake valve to pneumatically control a braking force at least one axle.

The present invention relates also to a vehicle with any one of the previously described brake systems.

The present invention relates also to a method for providing a redundant brake system for a vehicle. The vehicle comprises again a service brake control module and a parking brake with a spring brake chamber, wherein the service brake control module controls at least a first pressure module to brake a first set of wheels. The method comprises:
  controlling, by a parking brake control module, a brake pressure at the at least one spring brake chamber to brake a second set of wheels; and
  controlling, by the parking brake control module, the first pressure module to brake the first set of wheels.

The method may further comprise the step: upon a brake demand, providing simultaneously a brake signal to the service brake control module and to the parking brake control module to control the first pressure module via the service brake control module and via the parking brake control module in parallel (at the same time).

In summary, embodiments of the present invention solve at least some of the problems of the prior art by an electronic parking brake (EPB) used as a redundant brake system for a brake actuator on axles equipped with spring brake actuators and, in addition, on other axles without such actuators. The control can directly be provided by using the trailer control output port of the parking brake control module (e.g. EPB). This function and/or the respective additional components can be implemented as standalone units or can be integrated into any other pneumatic module like the air supply unit. Since the outputs of the electronic brake are inverted due to the spring brake actuation, the trailer control output port is, according to embodiments, modified by an exemplary inverse valve before connecting it to the pneumatic control input of the axle modulators.

Some examples of the systems and/or methods will be described in the following by way of examples only, and with respect to the accompanying figures.

DETAILED DESCRIPTION

Figure 1:
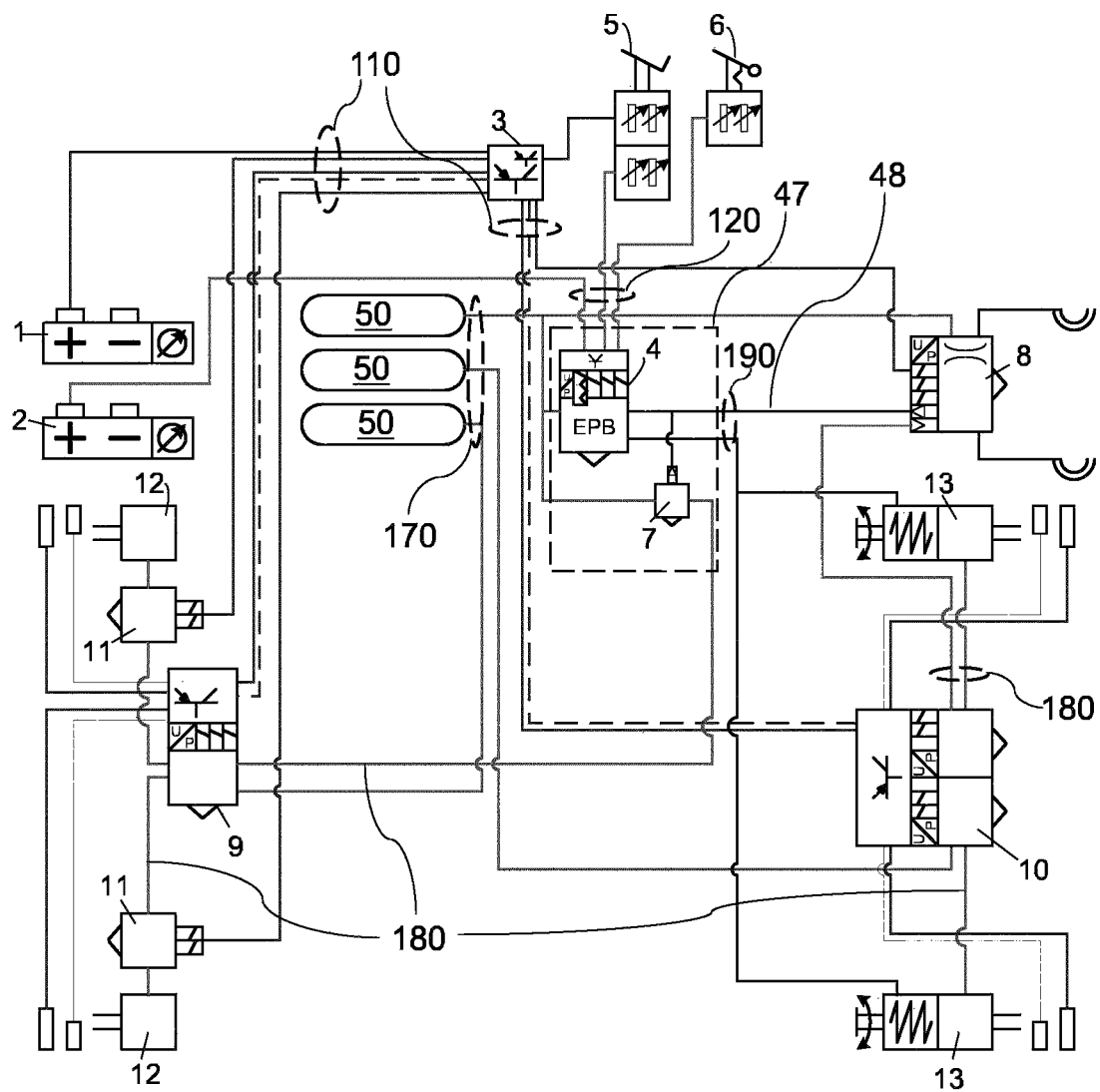
FIG. 1 depicts a schematic of a redundant electronic brake system for a commercial vehicle according to an embodiment of the present invention.

FIG. 1 depicts a brake system architecture of an exemplary commercial vehicle including a service brake control module 3 (electronically) controlling at least a first pressure module 9 to brake a first set of wheels (e.g. at the front axle). The vehicle further comprises a parking brake with one or more spring chamber (s) 13 to brake a second set of wheels (e.g. at the rear axle). The brake system architecture further comprises a brake system according to embodiments of the present invention with a parking brake control module 47 configured to control parking brake to brake the second set of wheels and to control the first pressure module 9 to brake the first set of wheels.

To operate the brake system, the architecture further comprises two redundant batteries 1,2, a pressurized air supply 50, a first brake pedal sensor 5 and a second brake pedal sensor 6. These supply and control units couple to the first pressure module 9, to a second pressure module 10 and a trailer control module 8 through the pneumatic supply lines 170. The first pressure module 9 provides, for example, pressurized air to the front axle brakes through pressure control valves 11 to service brake chambers 12. The second pressure module 10 provides pressurized air to the spring brake chambers 13 arranged, for example, at the rear axle. The first and second pressure modules 9,10 can be any kind of brake actuator (e.g. electronically controlled pressure modulator) to modulate the air pressure to achieve a desired braking force. The trailer control module 8 controls a braking action applied on brakes on the trailer based on a signals provided by the parking brake control module 47 on a trailer output line 48.

The supply batteries 1,2 provide already a redundancy, wherein the first battery 1 provides supply power for the service brake control module 3 which may implement an electronic brake system (EBS) that uses first electric lines 110 (e.g. solid lines are analogous and the dashed are digital lines). With the first electric lines 110 the service brake control module 3 controls the air pressure provided by the first and second pressure module 9,10 to the brakes. The second battery 2 provides supply power for the EPB unit 4 that uses second electric lines 120 (e.g. solid lines are analogous and the dashed are digital lines), which are different from the first electric lines 110. Hence the service brake control module 3 and the EPB unit 4 have an independent power supply using different electric lines 110, 120 so that they can operate as redundant systems.

The service brake control module 3 controls electronically the front axle pressure module 9, the pressure control valves 11 on the front axle, the rear axle pressure module 10 and the trailer control module 8. The front axle brakes are actuated by the service brake chambers 12, while the rear axle brakes are actuated by spring brake cylinders 13. The second pressure module 10 controls (e.g. when activating the parking brake) the spring brake cylinders 13 and the trailer control module 8 through pneumatic service brake control lines 180.

The parking brake control module 47 comprises, for example, a parking brake control unit 4 and an inverse valve 7. The inverse valve connects the first pressure module 9 with a pressurized air supply 50 and is controlled by the trailer output line 48 (or the respective signals on this line, e.g. a pressure value) while at least inverting (optionally also amplifying/damping) a corresponding control signal.

The redundant pair of brake systems is thus provided by the EPB unit 4, which is actuating the spring brake cylinders 13 on the rear axle by one pneumatic parking brake control line 190. It provides further a pneumatic control signal through the trailer output line 48 (another pneumatic parking brake control line 190) to the trailer control module 8, which likewise controls the inverse valve 7 (e.g. a relay or a proportional valve) commanding the pneumatic control pressure for the first pressure module 9 through another pneumatic service brake control line 180. Hence, the front axle or any other axles not equipped with spring brake cylinders 13 are controlled by the EPB unit 4 using its trailer output line 48. Moreover, the service brake can be commanded by the driver by the redundant brake pedal sensor 5 providing separate demand signals for both the service brake control module 3 and EPB unit 4. In addition, the parking brake can be commanded by the driver by a park brake actuator 6 (e.g. a lever sensor).

The inverse valve 7 can be a standalone unit or integrated into the EPB unit 4 or in the first pressure module 9. In the same way, the EPB unit 4 can be a standalone unit or integrated into any other module like a compressed air Processing unit 50.

When the brake system is intact the service brake can be controlled by the service brake control module 3 as a master. It controls electronically the first and second pressure modulates 9,10 and the trailer control module 8. In case of a malfunction of the service brake control module 3 or its power supply 1, the brake control is taken over by the EPB unit 4. The axles equipped with spring brake chambers 13 are actuated by a proportional parking brake control, while other axles without spring brake chamber 13 are controlled pneumatically through the inverse valve 7 and the first pressure module 9. On the other hand, if the EPB unit 4 or its power supply 2 has any malfunction the service brake control module 3 is controlling the brake system as in normal case. In this case, the parking brake function is temporally realized by the service brake actuation.

Figure 2:
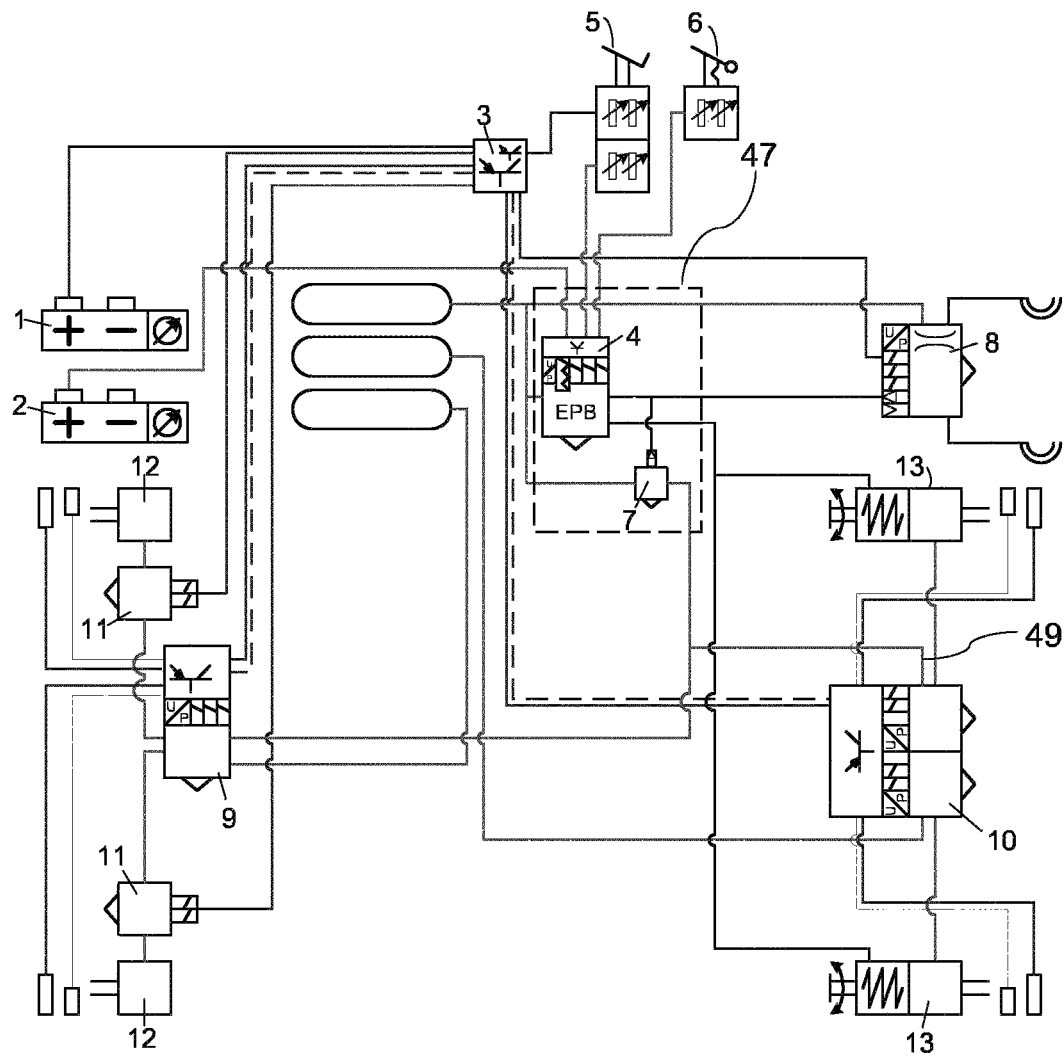
FIG. 2 depicts a schematic of a redundant electronic brake system including a coupling of the front and rear axle service brake by the EPB according to another embodiment of the present invention.

FIG. 2 depicts another embodiment of the brake system (e.g. for a commercial vehicle), wherein the parking brake control module 47 controls likewise the second pressure module 10. This controlling can be provided by a separate control line 49 connecting the inverse valve 7 with the second pressure control module 10 or any other further axle modulator. Therefore, in this embodiment, the brakes at the rear axle can be actuated by the electronic park brake unit 4 through the inverse valve 7 as well as through the spring brake chambers 13. This coupling of the front and rear axle service brake pneumatically controlled by the EPB improves the brake performance significantly.

Figure 3:
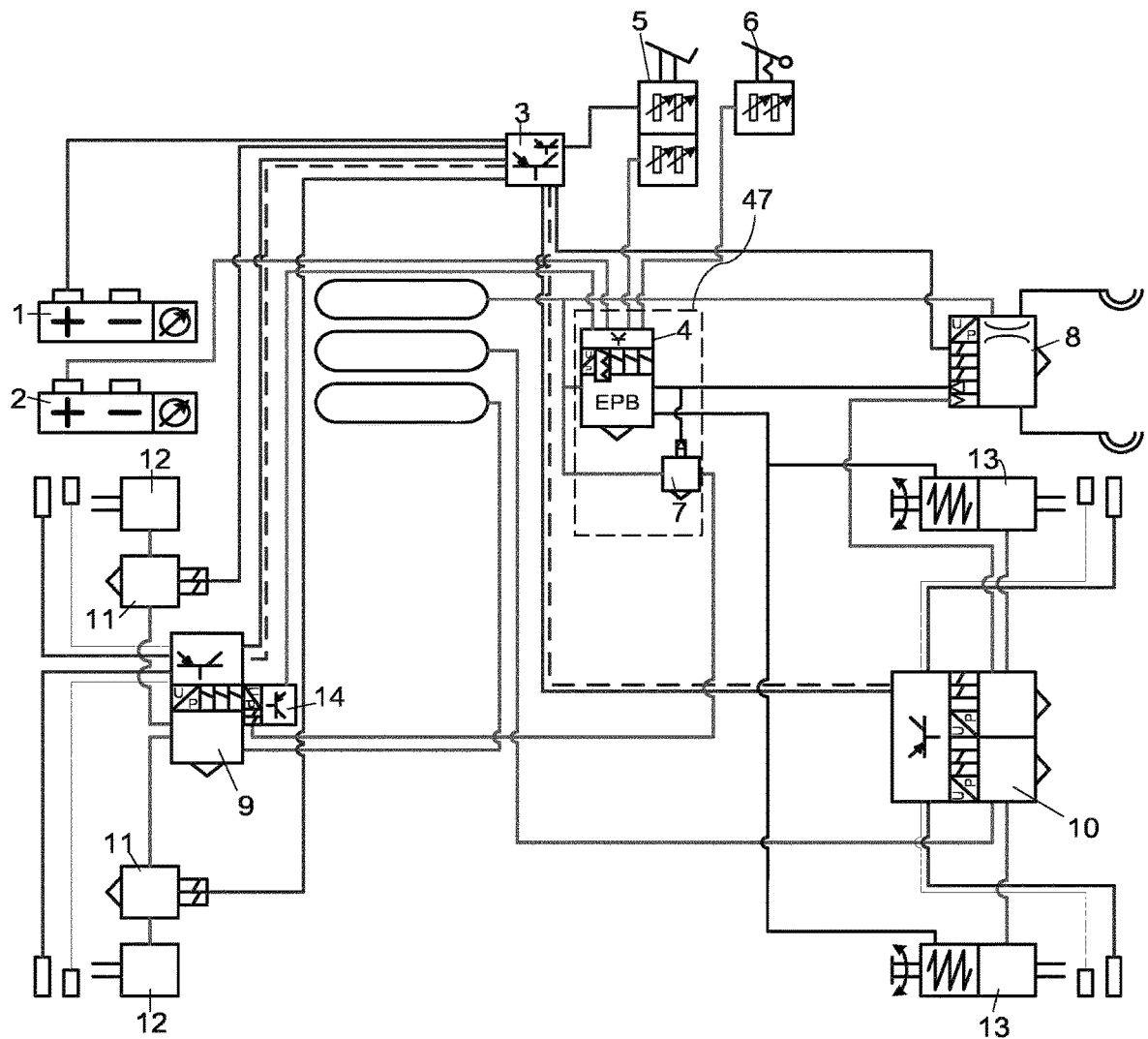
FIG. 3 depicts a schematic of a redundant electronic brake system with two-channel EPB control according to yet another embodiment of the present invention.

FIG. 3 depicts yet another embodiment of the brake system in the EBS architecture (e.g. for a commercial vehicle). When compared to the embodiment of FIG. 1, in the embodiment an electro-pneumatic unit 14 is provided between an output of the inverse valve 7 and the first pressure module 9. The electro-pneumatic unit 14 is controlled by the parking brake control unit 4. Thus, using this electro-pneumatic unit 14 the parking brake control module 47 can control the rear as well as the front axle brake forces in a predefined relation (e.g. as a single channel control). Another possible realization can be implemented, where the parking brake control module 47 modifies the ratio or relation of the brake forces between the axles with and without spring brake chambers 13 (e.g. independently) during the brake actuation (implying a two-channel control implementation). In this way, the front axle brake force is no longer in a fixed relation to the brake force on the axles with the spring brake cylinders 13. This provides a significant advantage in case of a critical vehicle dynamic situation like an ABS braking.

Figure 4:
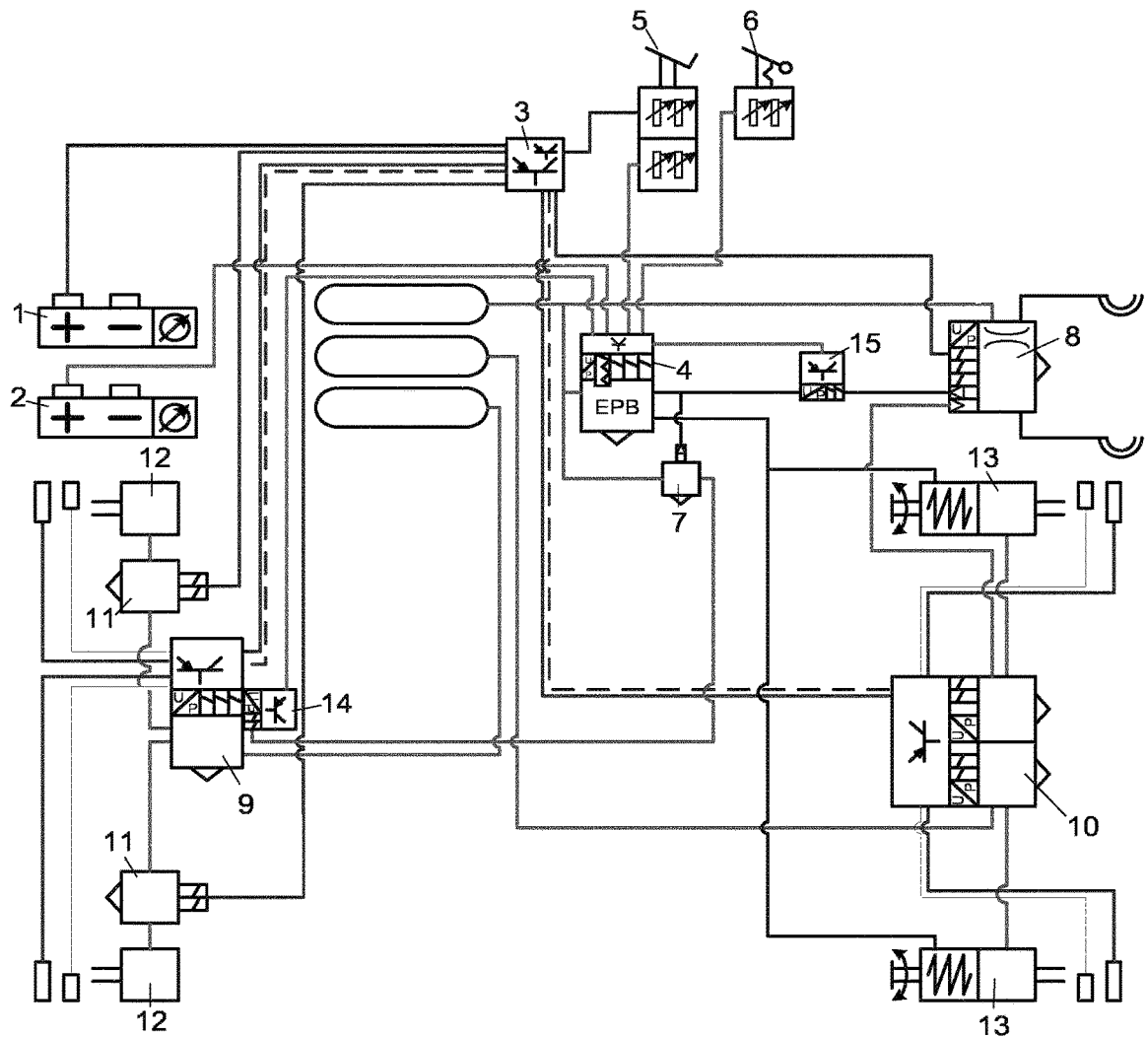
FIG. 4 depicts a schematic of a redundant electronic brake system with independent EPB trailer control according to yet another embodiment of the present invention.

FIG. 4 depicts yet another embodiment which differs from the embodiment shown in FIG. 1 only in that an electro-pneumatic control valve 15 is provided between the parking brake control unit 4 and the trailer control module 8 to electronically control the trailer control module 8. The electronic control may be provided by the parking brake control unit 4. The electro-pneumatic control valve 15 is added between the parking brake control unit 4 and the trailer control module 8 to enable an independent modulation of the trailer brakes from the tractor brakes by the EPB unit 4. All other components are the same or similar to the embodiments in FIG. 1 so that a repeated description is not needed here.

Figure 5:
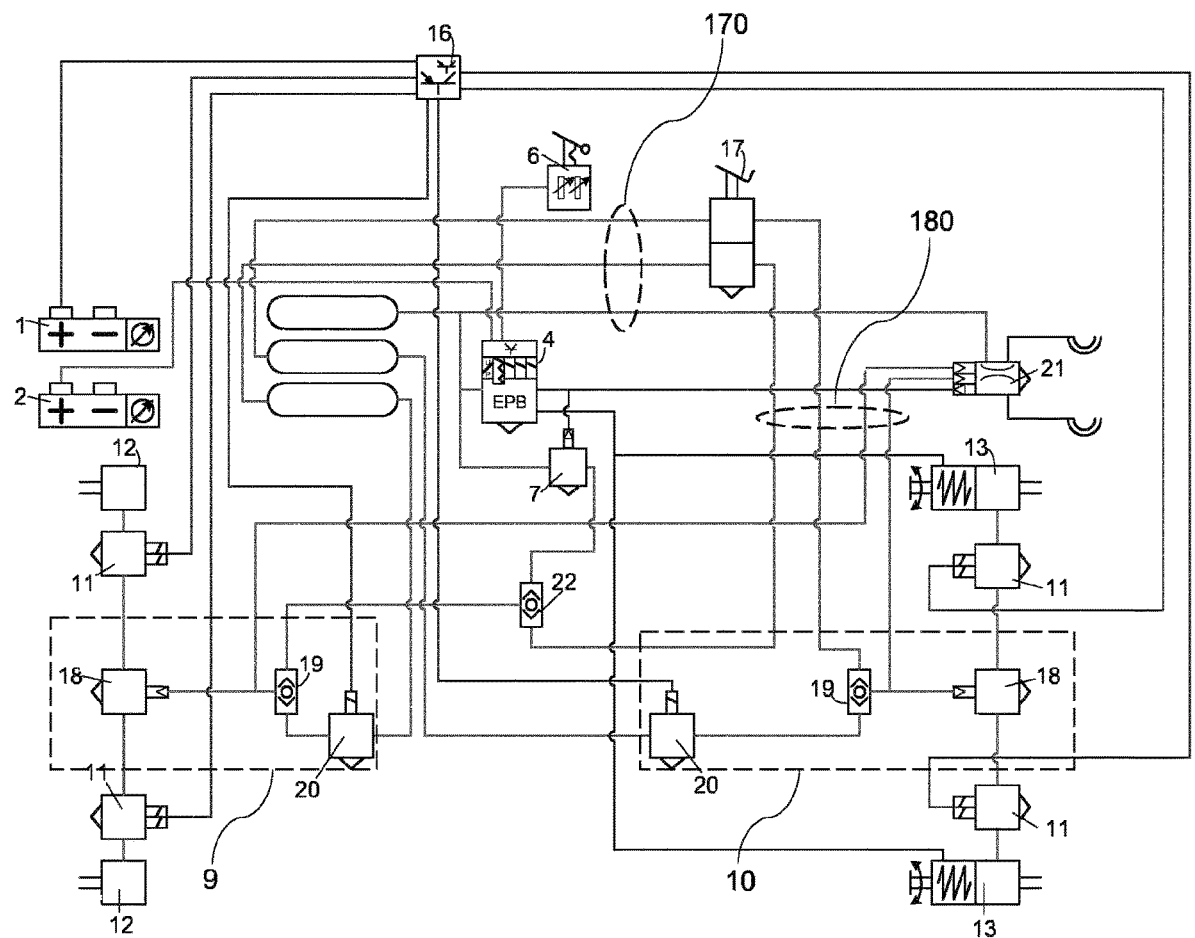
FIG. 5 depicts a schematic of a redundant ABS brake system including a front axle service brake pneumatic control by the EPB according to yet another embodiment of the present invention.

FIG. 5 depicts an embodiment of the present invention which implements an architecture (e.g. for a commercial vehicle) including an anti-blocking system (ABS). In this embodiment, the first pressure module 9 comprises a relay valve 18, a select high valve 19 and an electronic pressure control valve 20. Similarly, the second pressure control module 10 comprises another relay valve 18, another select high valve 19 and another pressure control valve 20. When compared to the previous embodiments, further pressure control valves 11 are arranged between the second pressure control module 10 and the spring brake chamber 13. In addition, a control unit 16 is provided to control all pressure control valves 11.

The embodiment of FIG. 5 further comprises a pneumatic foot brake valve 17 which is connected to the pressurized air supply 50 by the pneumatic supply lines 170 and provide the pneumatic control lines 180 to provide pressure for the select high valve 19 and another select high valve 22. The trailer control module 8 is now a pneumatic trailer control valve 21 and is likewise connected by the pneumatic control lines 180 to the output of the select high valves 19 to control the breaking of the trailer together with braking of the wheels on the front and rear axle. Unlike in previous embodiments, the trailer control module 8 is not controlled directly by the service brake control module. Rather, the trailer control module 8 in this embodiment is a fully pneumatic trailer control valve 21.

The electronic brake System of FIGS. 1 to 4 differs from the ABS-based architecture of FIG. 5 mainly by the fact that the ABS architecture provides a fully pneumatic foot brake valve 17 and therefore there is no need of having axle pressure modulators 9 and 10 and an electronic trailer control module 8 that are electronically controlled. Instead, the relay valves 18 adjusting the braking force on each axle are (pneumatically) controlled by the output of the select high valves 19. In addition, the output of one of the select high valves 19 controls the fully pneumatic trailer control valve 21. The inputs for the select high valves 19 may come from the electronic pressure control valves 20 and from the foot brake valve 17. However, the input of the select high valve 19 may or may not come directly from the foot brake valve 17. For example, at the rear axle the input may come directly from the foot brake valve, whereas at the front axle the input may come through an additional select high valve 22 which is controlled by the output of the inverse valve 7.

It is understood that all embodiments shown in the various Figures can be combined with each other. For example, the electro-pneumatic control valves 14, 15 as depicted in FIGS. 3, 4 may also be incorporated into the architectures as shown in FIG. 1,2 or 5. Same applies to the control line 49 or the relay valve 18, the select high valve 19 and the pressure control valve 20 of FIG. 5.

Further advantageous embodiments of the present invention can be summarized as follows:

One further embodiment relates to a system of a commercial vehicle with electro-pneumatic service brake system and an electro-pneumatic parking brake system (according to FIG. 1), wherein the axles not equipped with spring brake chambers 13 (e.g. front axle with module 9) are pneumatically controlled by the EPB 4 from its trailer control output, through an inverse valve 7.

The inverse valve 7 of this system can be a standalone unit, or integrated into the EPB 4 or the axle module 9.

The EPB unit 4 may also be a standalone unit or an integrated part of any other module like, e.g. a compressed air supply module.

The output of the inverse valve 7 can be pneumatically controlling all axle modules 9 and 10 of the tractor, i.e. not only the first pressure module 9 (see FIG. 2).

The inverse valve 7 output may be electronically modulated by the EPB unit 4 using the electro-pneumatic pressure control valve 14 (see FIG. 3). The electro-pneumatic pressure control valve 14 can be a standalone unit or integrated into the inverse valve 7 or the axle modules (first and second pressure module 9, 10).

The trailer control output 48 of the EPB unit 4 can be electronically modulated by the EPB unit 4 by using an electro-pneumatic pressure control valve 15, which is located downstream to the control input of the inverse valve 7 (see FIG. 4). The electro-pneumatic pressure control valve 15 can be a standalone unit or integrated into the inverse valve 7, the EPB unit 4 or the trailer control module 8.

The output of the inverse valve 7 can pneumatically control at least one axle through at least with a select high valve 22 (see FIG. 5).

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

THE LIST OF REFERENCE SIGNS is as follows:
1, 2 batteries
3 service brake control module
4 parking brake control unit
5 first brake pedal sensor
6 second brake pedal sensor
7 inverse valve
8 trailer control module
9 first pressure modulator
10 second pressure modulator
11 pressure control valves
12 service brake chambers
13 spring brake chambers
14,15 electro-pneumatic units
16 a control unit
17 foot brake valve
18 relay valves
19, 22 select high valves
20 electronic pressure control valves
21 pneumatic trailer control module
47 parking brake control module
48 trailer output line
50 pressurized air supply
110 first electric lines
120 second electric lines
170 pneumatic supply lines
180 (pneumatic) service brake control lines
190 pneumatic) parking brake control lines

The invention claimed is:

1. A brake system for a vehicle, comprising:
 a service brake control module;
 a parking brake with at least one spring brake chamber, wherein the service brake control module electronically controls at least a first pressure module to brake a first set of wheels; and
 a parking brake control module to control the spring brake chamber to brake a second set of wheels and to control the first pressure module to brake the first set of wheels;
 wherein the parking brake control module includes a trailer output line to couple to a trailer control module for controlling a braking of a trailer, and an inverse valve controlled by the trailer output line to enable a pneumatic control for the first pressure module, and
 wherein an electro-pneumatic unit is arranged to control the first pressure module with the inverse valve.

2. The brake system of claim 1, wherein the first pressure module is controlled in parallel by the service brake control module and by the parking brake control module to ensure a redundant braking system.

3. The brake system of claim 1, wherein the service brake control module is configured to control the braking of the first set of wheels through the first pressure module and the second set of wheels through a second pressure module, and wherein the parking brake control module is configured to control the second pressure module to actuate the spring brake chamber upon a parking brake request.

4. The brake system of claim 3, wherein the parking brake control module includes a parking brake control unit to pneumatically control the trailer control module and/or the spring brake chamber, and wherein the inverse valve is integrated in the parking brake control unit or in the first pressure modulator or is a standalone unit, and/or the parking brake control unit is a standalone unit or an integrated part of a component of the brake system.

5. The brake system of claim 1, wherein the inverse valve includes an output pneumatically controlling the first pressure module and a second pressure module.

6. The brake system of claim 1, wherein the vehicle includes a foot brake valve controllable by a driver, further comprising:
at least one further select high valve arranged downstream of an output of the inverse valve to select a higher pressure between the output of the inverse valve and the foot brake valve to pneumatically control a braking force at least one axle.

7. A brake system for a vehicle, comprising:
a service brake control module;
a parking brake with at least one spring brake chamber, wherein the service brake control module controls at least a first pressure module to brake a first set of wheels; and
a parking brake control module to control the spring brake chamber to brake a second set of wheels and to control the first pressure module to brake the first set of wheels;
wherein the parking brake control module includes a trailer output line to couple to a trailer control module for controlling a braking of a trailer, and an inverse valve controlled by the trailer output line to enable a pneumatic control for the first pressure module, and
wherein an electro-pneumatic unit is arranged between the inverse valve and the first pressure module to control the first pressure module by modulating an output of the inverse valve.

8. The brake system of claim 7, wherein the electro-pneumatic unit includes an electro-pneumatic control valve being a standalone unit or an integrated part of the inverse valve or of the first pressure module or of a second pressure module.

9. A brake system for a vehicle, comprising:
a service brake control module;
a parking brake with at least one spring brake chamber, wherein the service brake control module controls at least a first pressure module to brake a first set of wheels; and
a parking brake control module to control the spring brake chamber to brake a second set of wheels and to control the first pressure module to brake the first set of wheels;
an electro-pneumatic unit arranged downstream of a trailer output line of the parking brake control module to electronically modulate the trailer control module;
wherein the electro-pneumatic unit includes an electro-pneumatic control valve as a standalone unit or an integrated part of an inverse valve or of the parking brake control module or of a trailer control module, and wherein the electro-pneumatic unit is arranged to control the first pressure module by modulating an output of the inverse valve.

10. A brake system for a vehicle, comprising:
a service brake control module;
a parking brake with at least one spring brake chamber, wherein the service brake control module controls at least a first pressure module to brake a first set of wheels; and
a parking brake control module to control the spring brake chamber to brake a second set of wheels and to control the first pressure module to brake the first set of wheels;
wherein the service brake control module is configured to control the braking of the first set of wheels through the first pressure module and the second set of wheels through a second pressure module, and wherein the parking brake control module is configured to control the second pressure module to actuate the spring brake chamber upon a parking brake request, and
wherein the vehicle includes a control unit to electronically control a pneumatic brake pressure, wherein the first pressure module and/or the second pressure module are electronic pressure modulators and/or include at least one of: a relay valve, a select high valve, a pressure control valve, and wherein the pressure control valve is controlled by the control unit to provide compressed air to the select high valve, the select high valve being configured to receive further compressed air from an inverse valve and to provide the higher received compressed air to the relay valve as control input to modulate a brake pressure in accordance to a brake demand.

11. A vehicle, comprising:
a brake system, including:
a service brake control module;
a parking brake with at least one spring brake chamber, wherein the service brake control module electronically controls at least a first pressure module to brake a first set of wheels; and
a parking brake control module to control the spring brake chamber to brake a second set of wheels and to control the first pressure module to brake the first set of wheels;
wherein the parking brake control module includes a trailer output line to couple to a trailer control module for controlling a braking of a trailer, and an inverse valve controlled by the trailer output line to enable a pneumatic control for the first pressure module, and
wherein an electro-pneumatic unit is arranged between the inverse valve and the first pressure module to control the first pressure module by modulating an output of the inverse valve.

12. A method for providing a redundant brake system for a vehicle, which includes at least one service brake control module and a parking brake with a spring brake chamber, the service brake control module controlling at least a first pressure module to brake a first set of wheels, the method comprising:
controlling, by a parking brake control module, a brake pressure at the at least one spring brake chamber to brake a second set of wheels;
electronically controlling, by the parking brake control module, the first pressure module to brake the first set of wheels; and
simultaneously providing, upon a brake demand, a brake signal to the service brake control module and to the parking brake control module to control the first pressure module via the service brake control module and via the parking brake control module in parallel;

wherein the parking brake control module includes a trailer output line to couple to a trailer control module for controlling a braking of a trailer, and an inverse valve controlled by the trailer output line to enable a pneumatic control for the first pressure module.

* * * * *